Jan. 17, 1967  C. A. LASCH, JR., ET AL  3,299,196
DIFFUSION FURNACE
Filed July 13, 1964  2 Sheets-Sheet 1
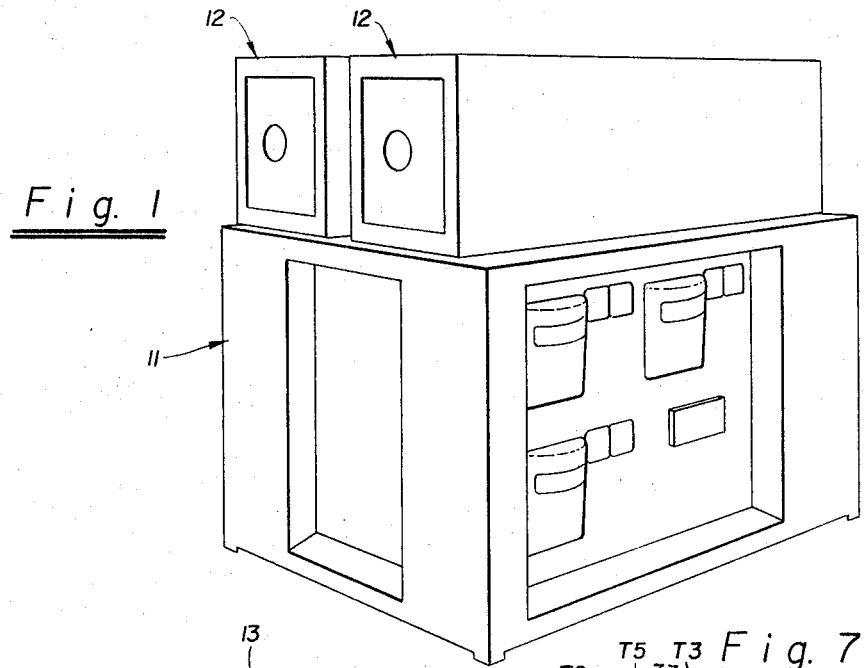
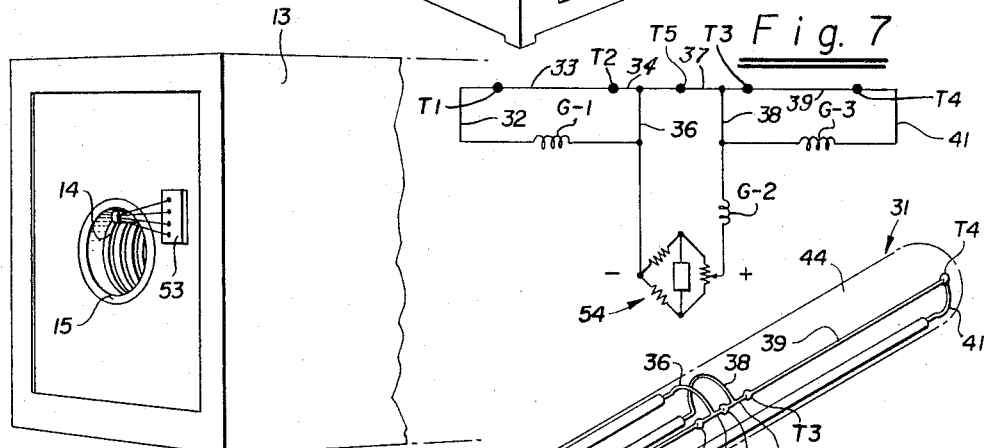
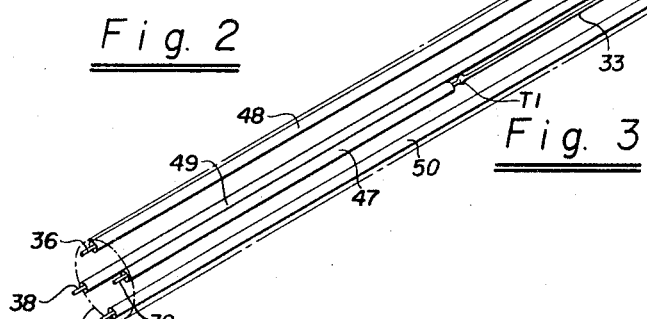
INVENTORS
Cecil A. Lasch, Jr.
Gordon P. Hampton
Boris J. Speransky
BY
Attorneys

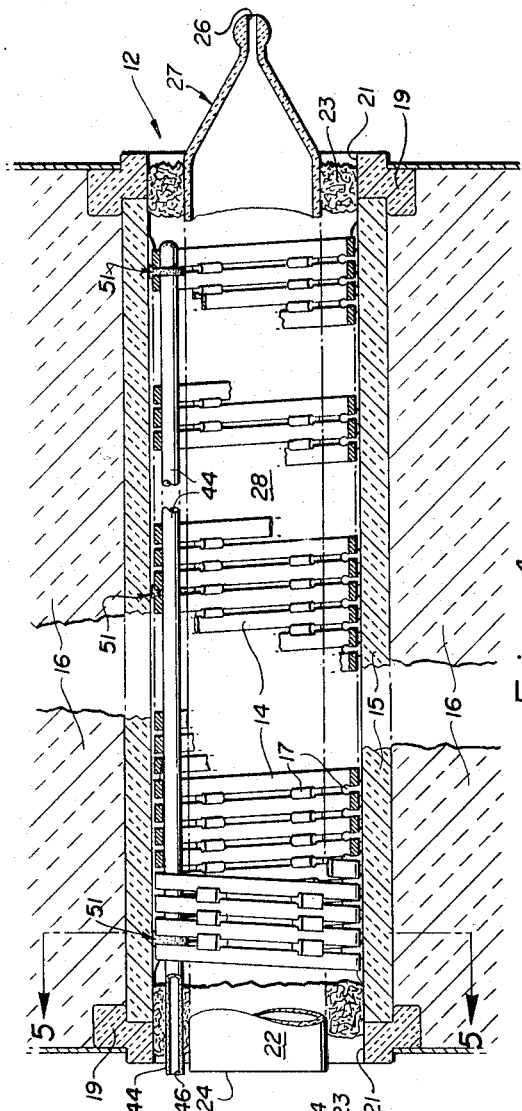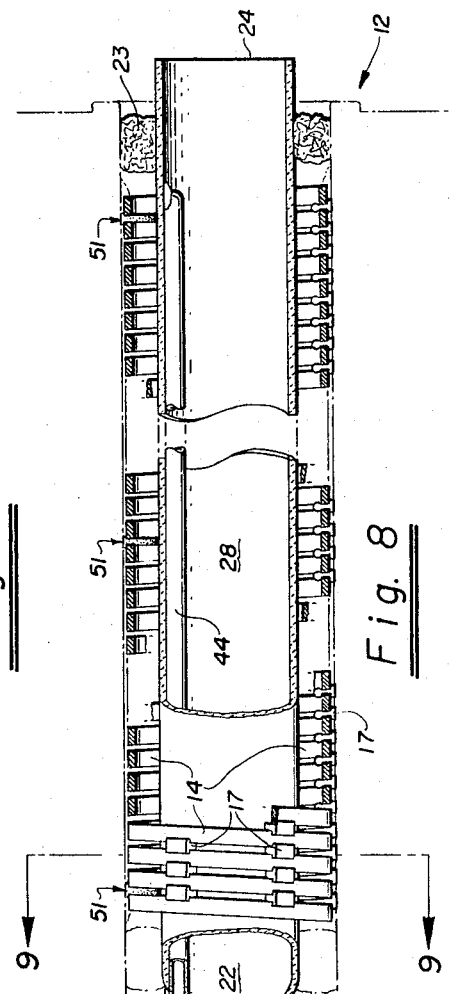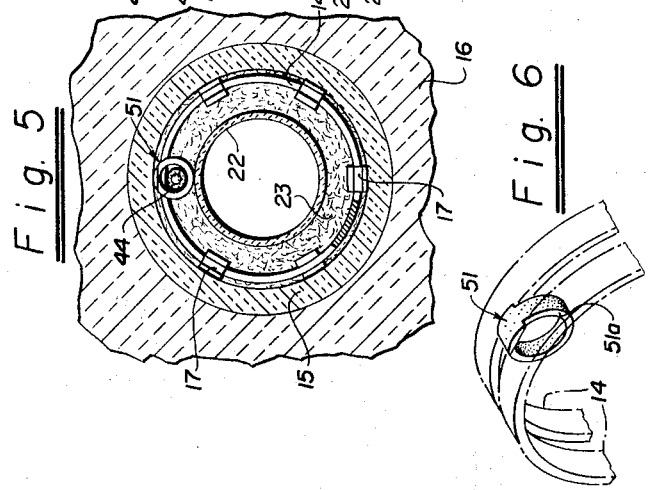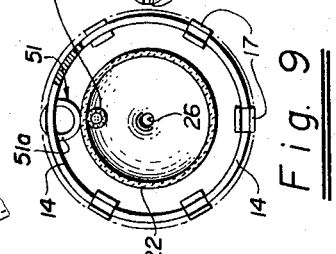
INVENTORS
Cecil A. Lasch, Jr.
Gordon P. Hampton
BY Boris J. Speransky
Attorneys United States Patent Office 3,299,196
Patented Jan. 17, 1967

3,299,196
DIFFUSION FURNACE
Cecil A. Lasch, Jr., Redwood City, Gordon P. Hampton, Sunnyvale, and Boris J. Speransky, Menlo Park, Calif., assignors to Electroglas, Inc., Menlo Park, Calif., a corporation of California
Filed July 13, 1964, Ser. No. 382,038
9 Claims. (Cl. 13—24)

This invention relates to a diffusion furnace and more particularly to a diffusion furnace which incorporates a particularly novel thermocouple arrangement and system.

In the past, it has been the practice to provide diffusion furnaces with thermocouples by extending the thermocouples through the side insulation of the furnace and to bring it as close as possible to the exact center of the muffle. With such an arrangement of the thermocouples, it has been found that it is almost impossible to measure the temperature accurately because of the difficulty of positioning the thermocouples and also because of the very short temperature gradient from the heated surface to the ambient room temperature in the furnace. Because of these facts, the thermocouples may be measuring as much as 3–7° C. below the actual temperature within the furnace. Also, with such an arrangement, it has been found that when a load is introduced into the furnace, the radiation pattern affecting a particular thermocouple is disrupted to cause the thermocouple to indicate a change in temperature which actually has not taken place. This will cause the temperature controller for the furnace to raise the temperature of the furnace as much as 2 or 3° higher than the desired temperature until the load is removed. A master-slave thermocouple system incorporating five thermocouples is disclosed in copending application Serial No. 317,268, filed Oct. 18, 1963. As disclosed in this application, such a master-slave thermocouple system includes one central master thermocouple connected to the constant voltage source of a digital set point unit so that its output voltage is bucking the output voltage of the unit. It also includes two thermocouples on both sides of the center master thermocouple placed as close to it as possible, but without direct contact with it, and two thermocouples at or near the ends of the proposed flat zone in the diffusion furnace. These last two thermocouples are connected back to back to each of the thermocouples on the sides of the central master thermocouple. A galvanometer and reference source are connected to the thermocouples. The satisfactory performance of such a master-slave system depends primarily on the even distribution of the amount of heat radiation to all five thermocouples involved. As explained above, this condition is difficult to achieve with the present thermocouple arrangements and placement. There is, therefore, a need for a new and improved diffusion furnace and particularly a diffusion furnace with a new and improved thermocouple arrangement and system for use in temperature control of the diffusion furnace.

In general, it is an object of the present invention to provide a diffusion furnace of the above character which avoids or overcomes the above named disadvantages.

Another object of the invention is to provide a diffusion furnace of the above character which utilizes a particularly unique thermocouple arrangement and system.

Another object of the invention is to provide a diffusion furnace of the above character in which the thermocouples can be readily inserted and removed.

Another object of the invention is to provide a diffusion furnace of the above character in which only four wires are required to connect to the thermocouple assembly.

Another object of the invention is to provide a diffusion furnace of the above character in which there is no interaction between the master and slave thermocouples.

Another object of the invention is to provide a diffusion furnace of the above character in which a three-loop system is used.

Additional objects and features of the invention will appear from the following description in which the preferred embodiments are set forth in detail in conjunction with the accompanying drawings.

Referring to the drawings:

FIGURE 1 is an isometric view of a diffusion furnace incorporating our invention.

FIGURE 2 is a partial isometric view of one of the furnace units of the diffusion furnace shown in FIGURE 1.

FIGURE 3 is a greatly enlarged view of the thermocouple assembly utilized in the diffusion furnace shown in FIGURES 1 and 2.

FIGURE 4 is an enlarged detail view of a portion of the furnace unit shown in FIGURE 2.

FIGURE 5 is a cross-sectional view taken along the line 5—5 of FIGURE 4.

FIGURE 6 is an isometric view of one of the rings utilized for suspending the thermocouple assembly within the furnace unit.

FIGURE 7 is a circuit diagram of a temperature control for the diffusion furnace utilizing the thermocouple arrangement shown in FIGURE 3.

FIGURE 8 is a view similar FIGURE 4 but showing another embodiment of our thermocouple assembly.

FIGURE 9 is a cross-sectional view taken along the line 9—9 of FIGURE 8.

In general, our diffusion furnace consists of a heating element which surrounds a processing zone. A plurality of thermocouples are disposed inside the heating element and adjacent the processing zone for measuring the temperature in the processing zone. Control means is utilized for controlling the temperature of the heating element and the temperature in the processing zone sensed by the thermocouples. Means is provided for connecting the thermocouples to the control means.

As shown in the drawings, our diffusion furnace consists of a large control cabinet 11 upon which is mounted a plurality of furnace assemblies 12. Each of the furnace assemblies 12 consists of a rectangular casing 13. A helical heating element 14 extends longitudinally of the casing 13 and is supported within the casing in a suitable manner such as by means of a ceramic tube 15 carried by firebrick 16 positioned within the casing 13. Ceramic separators 17 are used for maintaining separation between the turns of the heating element and are cemented to the tube 15. Flanges 19 of a suitable material such as ceramic are mounted in the casing 13 on opposite ends of the heating element 14 and each is provided with an opening 21 which is substantially of the same size as the inner diameter of the ceramic tube 15.

A processing tube 22 formed of a suitable material such as quartz is disposed within the heating element 14 and is supported within the flanges 19 in a suitable manner such as by means of quartz wool 23. The processing tube 22 is provided with an open end 24 and a smaller opening 26 which is provided in a necked portion 27 of the processing tube. This opening 26 is provided for introducing gases into the processing tube 22. A processing zone is formed by the processing tube 22 which is disposed within and surrounded by the heating element 14 for the purpose of processing parts and apparatus as hereinafter described.

The portions of the diffusion furnace thus far described are substantially conventional, and for that reason have not been described in detail. In such a conventional diffusion furnace, a control system is provided for controlling the energy which is supplied to the heating element 14. Such means conventionally includes thermocouples for sensing the temperature in the processing zone. In the present diffusion furnace, a unique thermocouple arrangement is utilized with the control system for controlling the temperature within the processing zone 28. Thus, as shown in the drawings (FIGURE 3), the thermocouple assembly 31 is comprised of a plurality of thermocouples identified as T–1, T–2, T–3, T–4 and T–5. The thermocouples are formed by junctions between two dissimilar materials such as platinum and rhodium platinum. In the particular arrangement shown in FIGURE 3, a rhodium platinum wire 32 is spot welded to a platinum wire 33 to provide the thermocouple T–1. The wire 33 is spot welded to a rhodium platinum wire 34 to provide the thermocouple T–2. The wire 34 is connected to a similar rhodium platinum wire 36. The rhodium platinum wire 34 is also spot welded to another wire 37 of platinum to provide the thermocouple T–5. The wire 37 is connected to a wire of similar material, i.e., a platinum wire 38. The wire 37 is also connected to a rhodium platinum wire 39 by spot welding to provide the thermocouple T–3. The rhodium platinum wire 39 is connected to a platinum wire 41 by spot welding to provide the thermocouple T–4. As can be seen from FIGURE 3, the wires are of such a length that the thermocouples are spaced from each other and are disposed in a predetermined arrangement extending longitudinally of a suitable enclosing or supporting tube such as a quartz tube 44 which is transparent to radiant energy. The tube 44 is provided with an open end 46 out of which four leads 32, 36, 38, and 41 extend. In addition, the wires 32, 36, 38 and 41 are insulated from each other by suitable means such as individual quartz tubes 47, 48, 49 and 50 in which tube 47 is disposed on lead 32; tube 48 is disposed on lead 36; tube 49 is disposed on lead 38; and tube 50 is disposed on lead 41. As can be seen from FIGURE 3 of the drawings, the small tubes 47, 48, 49 and 50 are of various but suitable lengths to prevent the leads from engaging or contacting each other.

The entire thermocouple assembly is mounted within the heating element 14 in a suitable manner as, for example, as shown in FIGURE 4, the tube 44 with the thermocouples therein is supported within the heating element 14 and in or adjacent the processing zone 28. As shown in the drawings, suitable means for mounting the tube 44 in the processing zone consists of rings 51 of a suitable refractory material. The rings are of such a size and have portions 51a so that they can be fitted between coils or turns of the helical heating element 14, as shown in the drawings, so that the rings 51 are retained thereby and can be cemented to the tube 15. After the rings 51 have been positioned longitudinally of the heating element, the tube 44 containing the thermocouple arrangement may be positioned in the rings 51 as shown in FIGURE 4 of the drawings so that it is suspended immediately above the processing tube 22. In such a position, it can be seen that the thermocouple arrangement extends longitudinally of the processing zone 28. The leads 32, 36, 38 and 41 are connected to a terminal block 53 mounted on the casing 13 and are connected from the terminal block to the control system which includes null point galvanometers G1, G2 and G3, and a set point controller 54 mounted in the control cabinet 11, as shown in FIGURE 7. These parts of the control system are of the type described in copending application Serial No. 317,268, filed Oct. 18, 1963.

The operation and use of our diffusion furnace is very similar to that described in copending application Serial No. 317,268, filed Oct. 18, 1963, in which it is stated that before utilizing the furnace, the diffusion furnace is normally heated up for a considerable period of time. The thermocouple T–5 serves as the master thermocouple and senses the temperature in a central zone, whereas the thermocouples T–1 and T–4 sense the temperature in zones on opposite sides of the central zone. The outside zones are slaved to the central zone through the thermocouples and the control arrangement as described in copending application Serial No. 317,268, filed Oct. 18, 1963. The principal difference lies in the unique thermocouple arrangement 31 which has been described above. The thermocouples are made from junctions which are formed by spot welding so that they have a very low mass. The same is true of the wires which are connected to the thermocouples which also have a very low mass. In addition, quartz tubes are utilized for insulating the leads or wires from each other so that the entire assembly is substantially transparent to radiation. Thus, it can be seen that the thermocouples are directly responsive to radiation within the heating element 14 and very accurately measure the heat within the processing zone 28 since they are actually disposed within the processing zone and receive substantially the identical radiation which is received in the processing zone.

Very great stability is achieved because the thermocouples occupy stable positions longitudinally of the tube and there is no radial displacement which can take place with respect to the heating element because they are firmly held in position by the quartz tube 31. In addition, all the thermocouples receive the same percentage of heat radiation because of their placement in the suspended quartz tube extending the length of the heating element. All of the thermocouples are the same distance from the heated surface of the heating element, and for that reason the heat radiation to all the thermocouples will be substantially identical.

The thermocouple arrangement 31 is also unique in that it is possible to utilize only four lead wires for five thermocouples in three control loops (see FIGURE 7) which is a substantial reduction over the lead wires required in a conventional system. This is particularly advantageous because the material utilized for certain of the lead wires as, for example, the rhodium platinum, is very expensive. We have established mathematically that even though the number of wires connected to the thermocouple assembly is reduced to four, there is no interaction between the thermocouples so that the master-slave arrangement of the thermocouples is still operative. Thus, when the set point is changed, the temperature of the furnace will be changed as the slave thermocouples follow the master thermocouple.

With the unique thermocouple arrangement, there is a rapid heat transfer between the thermocouples because of the connecting noble metal wires which helps to equalize the temperatures along the chain of thermocouples and consequently equalizes the output voltages of the thermocouples. This starts the process of leveling the temperature along the length of the heating element in advance of what normally would be the case.

Another embodiment of our diffusion furnace is shown in FIGURES 8 and 9 and is very similar to that hereinbefore described with the exception that the thermocouple assembly 31 including the tube 44 is disposed within the processing tube 22 and is formed as an integral part thereof as can be seen particularly in FIGURE 8. As shown in FIGURE 8, the tube 44 is secured to the upper portion of the wall of the processing tube 22 and extends longitudinally of the processing tube and the heating element and has its open end 46 extending out beyond the processing tube so that the lead wires are readily accessible. The operation and use of this embodiment of our invention is substantially identical to that hereinbefore described. Again, because of the construction of the thermocouple assembly 31, the thermocouples sense very accurately the temperature within the processing zone 28 within the processing tube 22.

It is apparent from the foregoing that we have provided a new and improved diffusion furnace which utilizes a particularly unique thermocouple arrangement to make possible very precise control of the temperature within a diffusion furnace. The thermocouple arrangement is such that the thermocouple assembly 31 can be readily removed and replaced when desired. It is also one which can be readily and economically fabricated.

We claim:

1. In a diffusion furnace, a substantially hollow processing member having a processing zone therein, a heating element surrounding said processing member and supplying heat to said processing zone, said processing member being substantially transparent to radiation from the heating element, a plurality of thermocouples, means for supporting said thermocouples in positions adjacent to the processing zone and within the heating element, said means for supporting said plurality of thermocouples being substantially transparent to radiation from the heating element, said thermocouples being spaced apart longitudinally of the processing member, and control means connected to the thermocouples for controlling the heat supplied to the heating element in accordance with the temperature sensed by the thermocouples.

2. A diffusion furnace as in claim 1 wherein five thermocouples are utilized and wherein four separate wires are utilized for connecting the control means to the thermocouples together with individual insulating members mounted on each said wires for insulating the wires from each other, said insulating members mounted on said wires being substantially transparent to radiation from the heating element.

3. A diffusion furnace as in claim 1 in which said heating element is in the form of a coil which surrounds the tube and wherein said means for supporting said thermocouples includes a substantially transparent tube and support elements carrying the tube and secured to the heating element.

4. A diffusion furnace as in claim 3 in which the support elements are in the form of rings secured to the heating element.

5. A diffusion furnace as in claim 1 wherein said means for supporting the thermocouples includes a substantially transparent tube and means for securing the transparent tube to the processing member.

6. In a diffusion furnace, a substantially horizontal processing tube having an open end with a processing zone within the tube accessible from the open end, a heating element surrounding said processing tube for supplying heat to the processing zone within the tube, said processing tube being substantially transparent to radiation from the heating element, a plurality of thermocouples, means for supporting the thermocouples in a position adjacent to the processing zone and within the confines of the heating element, said means for supporting the thermocouples being substantially transparent to radiation from the heating element, said thermocouples being spaced apart longitudinally of the processing tube, and control means connected to the thermocouples for controlling the heat supplied to the heating element in accordance with the temperature sensed by the thermocouples.

7. A diffusion furnace as in claim 6 wherein said plurality of thermocouples are formed by a plurality of wires formed of dissimilar materials joined together to form a plurality of junctions of dissimilar materials in which the wires forming the junctions are joined together to form a single element extending longitudinally of the processing tube and wherein separate wires are provided for connecting the control means to the thermocouples formed by the junctions.

8. A diffusion furnace as in claim 7 wherein said wires connected to said thermocouples extend longitudinally of the processing tube and wherein said wires are insulated from each other by means substantially transparent to radiation from the heating element.

9. A diffusion furnace as in claim 7 wherein the dissimilar materials forming the junctions are platinum and platinum rhodium.

References Cited by the Examiner

UNITED STATES PATENTS

| | | | |
|---|---|---|---|
| 1,511,050 | 10/1924 | Collins et al. | 13—24 |
| 1,643,582 | 9/1927 | Martin. | |
| 1,893,847 | 1/1933 | Simpson | 13—24 |
| 1,985,967 | 1/1935 | Wunsch | 73—341 |
| 2,015,838 | 10/1935 | Borden et al. | |
| 2,118,179 | 5/1938 | Ellis et al. | |
| 2,398,874 | 4/1946 | Weyhing | 13—22 X |
| 2,661,385 | 12/1953 | Linkoln et al. | 13—20 |
| 2,825,222 | 3/1958 | Stone | 73—341 X |
| 3,074,695 | 1/1963 | Hold et al. | 219—244 X |
| 3,086,385 | 4/1963 | Branclereau et al. | 73—16 |

RICHARD M. WOOD, *Primary Examiner.*

V. Y. MAYEWSKY, *Assistant Examiner.*